Feb. 27, 1968   R. C. MITCHELL ET AL   3,370,866
SUPPORTING MEANS FOR A LOG BUNK
Filed Feb. 1, 1966   2 Sheets-Sheet 1
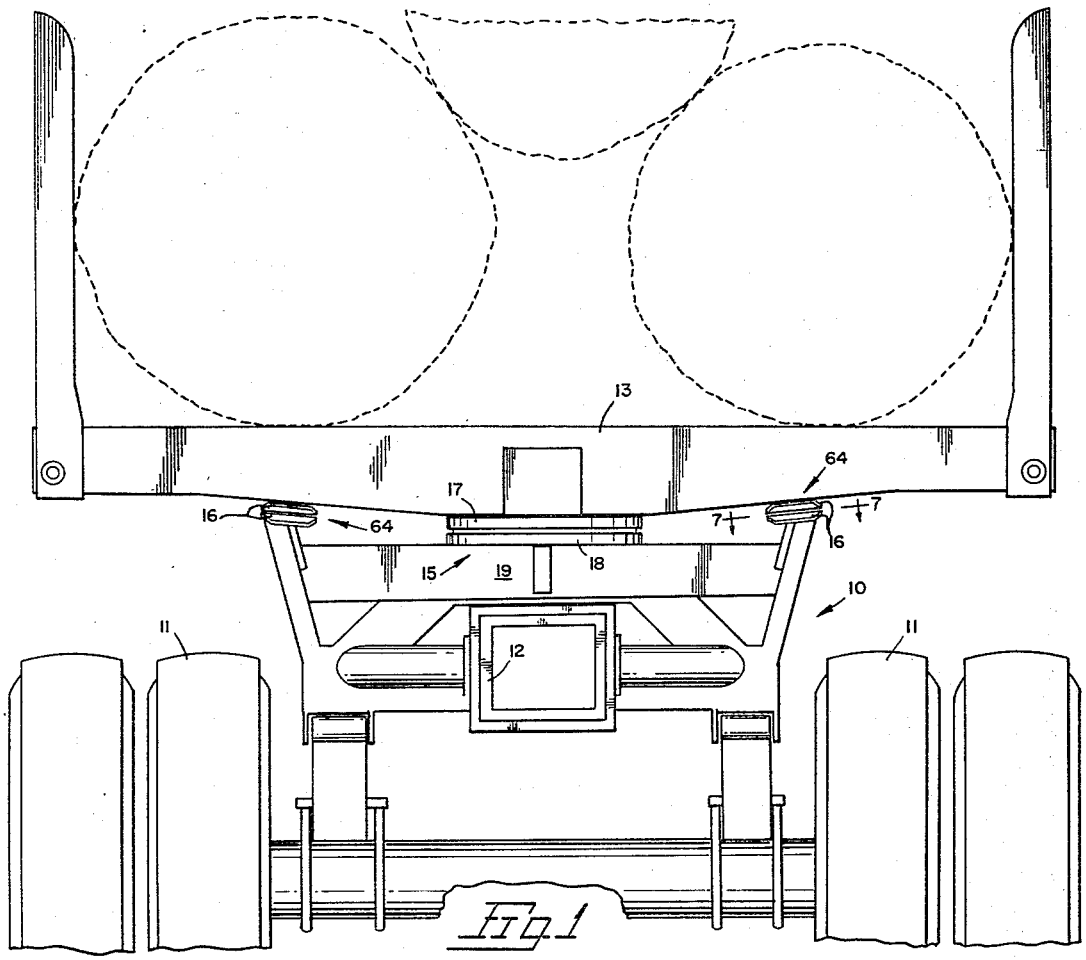
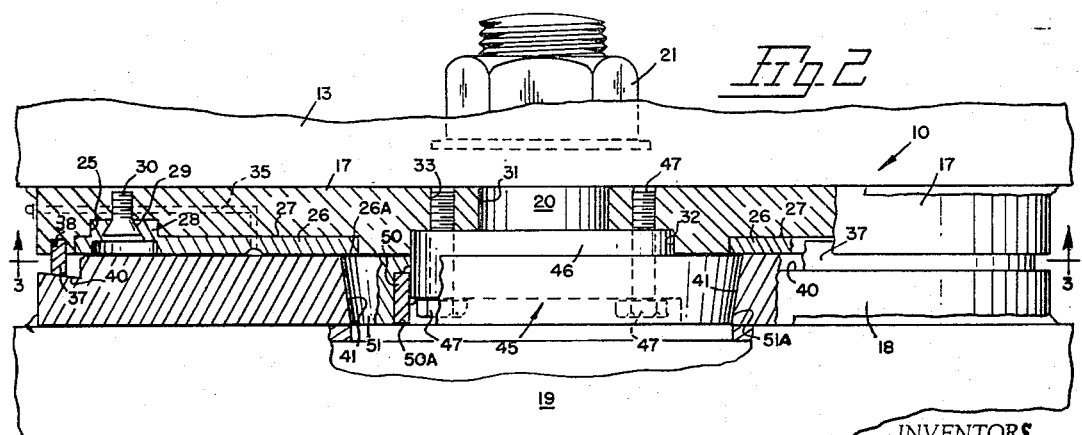
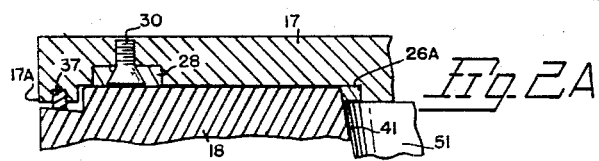
INVENTORS
ROGER C. MITCHELL
JOHN W. SHUSTER
BY
AGENT

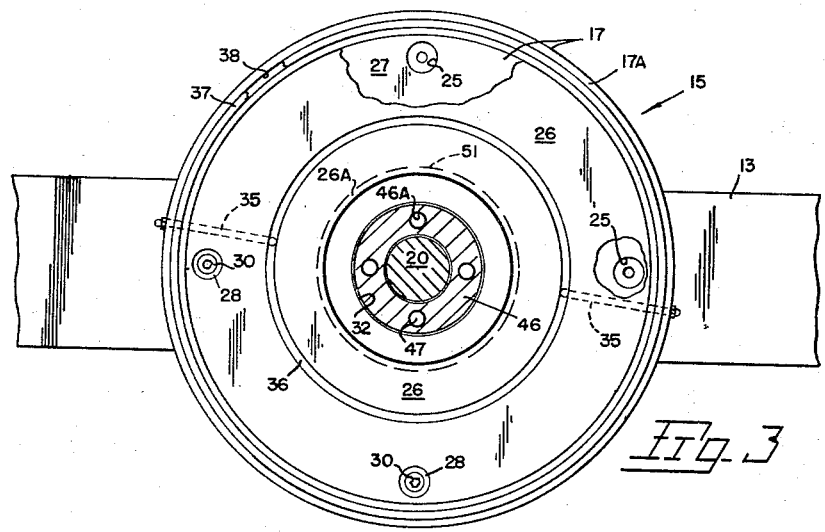
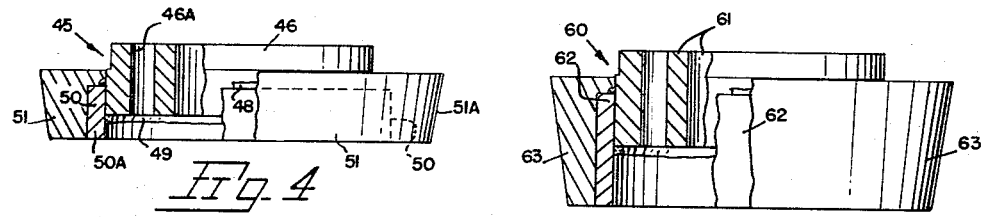
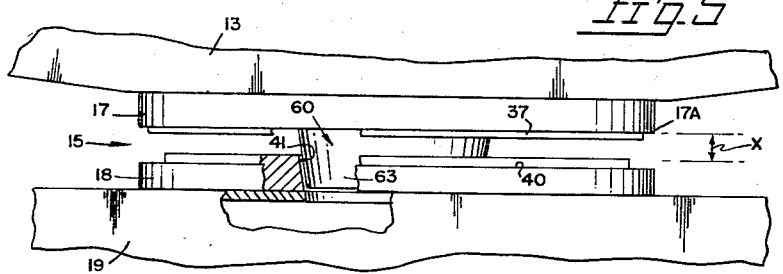
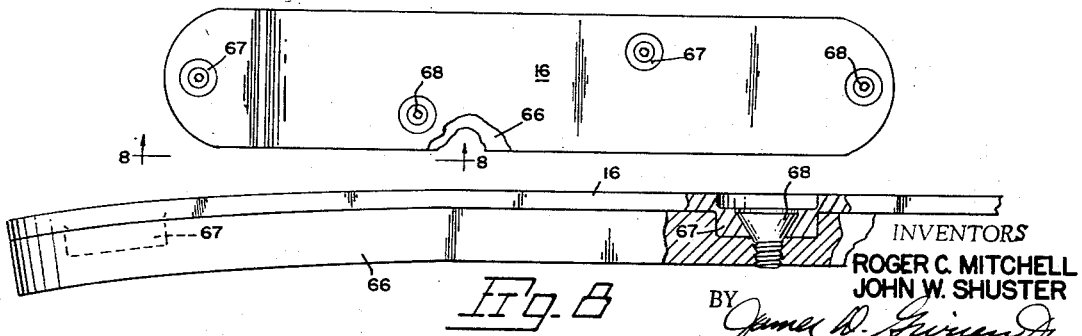
INVENTORS
ROGER C. MITCHELL
JOHN W. SHUSTER
AGENT

United States Patent Office 3,370,866
Patented Feb. 27, 1968

3,370,866
SUPPORTING MEANS FOR A LOG BUNK
Roger C. Mitchell, 336 Carolyn Drive, Eugene, Oreg. 97402, and John W. Shuster, 2133 Otto St., Springfield, Oreg. 97477
Filed Feb. 1, 1966, Ser. No. 524,078
10 Claims. (Cl. 280—404)

This invention relates generally to truck turntables and associated load bearing surfaces of the type commonly used in logging trucks to allow pivotal movement of the truck components relative to the load carried thereby.

An important object of this invention is to provide a turntable having all of its wear surfaces replaceable within permanent turntable members, said surfaces bearing axial as well as side loads. In conjunction with this object is the provision of commonly used fasteners securing the wear surfaces which permits expeditious replacement of the surfaces by use of ordinary tools readily available to every individual truck owner-operator. Simple and expedient replacement is of particular importance to the truck owner-operator in view of the usual turntable replacement involving costly and time-consuming work by a truck servicing machine shop.

A further object is the provision of novel turntable hubs secured in place in a manner permitting convenient interchange of hubs of different vertical dimensions. Recent developments in the weighing of log loads carried by trucks have included the weighing thereof by air scales. Such scales are supported by the truck and indicate the load by the air pressure required to elevate the log carrying bunks from the truck. The elevation is of very slight dimension, less than one inch, and takes place between the upper and lower turntable members. By providing readily interchangeable turntable hubs of different vertical dimensions, it is practical for the individual truck owner-operator to engage in contract hauling and to equip his truck to suit the particular type of weighing method used by the logging contractor.

A further object of this invention is to provide a wear plate within the turntable having abrasion resistant qualities and provided with integral, spaced projections or bosses engaged with supporting members of the turntable to prevent rotational displacement of said wear plate about the pivot or center pin of the turntable hence no shearing load is borne by the fasteners used to attach the wear plate. Associated with this object is the provision of pairs of replaceable wear surfaces, referred to generally in the fields as rub irons, laterally spaced from the turntable, positioned face-to-face on the log bunk and trailer members of a truck, and in similarity to the wear plate, are provided with spaced apart projections or bosses for bearing horizontally directed loads imparted to the rub irons during negotiation of turns by the truck.

An additional significant object of the present invention resides in the novel construction of the hub member of the turntable wherein an abrasion resistant bearing metal such as phosphor-bronze is cast in place about the periphery of a centrally disposed steel ring. Such hub construction provides an extremely strong, durable hub of economical manufacture since the above members of the hub are secured to each other by the contraction during cooling of the bearing metal subsequent to casting.

The foregoing and other objects and advantages which will become subsequently apparent reside in the details of construction and operation as more fully hereinafter described and claimed, reference being had to the accompanying drawings forming a part hereof and in which:

FIGURE 1 is an end elevational view of a log truck trailer showing the instant turntable and laterally spaced load bearing surfaces disposed intermediate the truck trailer and a log bunk carried thereby.

FIGURE 2 is an elevational view of the turntable of FIGURE 1 on an enlarged scale and with parts thereof broken away for convenience of illustration.

FIGURE 2A is a fragmentary view similar to FIGURE 2 showing the relationship of the members at a position of maximum wear.

FIGURE 3 is a sectional, plan view of the turntable taken along line 3—3 of FIGURE 2.

FIGURE 4 is a side elevational view of one form of turntable hub of the present invention.

FIGURE 5 is a view similar to FIGURE 4 showing a modified form of hub.

FIGURE 6 is a side elevational view of a turntable provided with the hub shown in FIGURE 5 and wherein the turntable members are vertically spaced concomitant with the weighing of a log load by air scales.

FIGURE 7 is a plan view of one of the wear surfaces of a rub iron taken along line 7—7 of FIGURE 1.

FIGURE 8 is an enlarged, fragmentary view of the wear surface and supporting bracket therefor taken approximately along the line 8—8 of FIGURE 7.

With continuing reference to the drawings and particularly to FIGURE 1 thereof, the reference numeral 10 indicates generally the trailer of a log or pole carrying truck having wheels 11 and attached to the truck tractor or a forward trailer by an elongate reach 12. The logs are shown supported by a conventional bunk structure indicated at 13 which is exemplary of an additional bunk structure (not shown) associated with the tractor or forward trailer. The bunk structures are rotatably supported for maneuvering purposes by turntables one of which is indicated generally at 15 and comprises a part of the present invention. Outwardly disposed from the turntable and subjacent the bunk structure 13 are wear surfaces 16 generally referred to in the art as "rub irons" and by reason of their novel structure also constitute a part of the present invention as hereinafter elaborated upon.

As best shown in FIGURE 2, the turntable 15 comprises top and bottom plates 17–18 permanently secured by welding to the underside of the bunk 13 and the opposing upper surface of a trailer crossmember 19. A center bolt or pin 20 extends axially through the plates 17–18 and is provided at both of its ends with nut members as at 21 bearing upon a web portion of the bunk and oppositely at its lower end against the interior surface of crossmember 19.

With continuing reference to FIGURE 2 and also FIGURE 3, the top plate 17 is characterized by a plurality of radially spaced recesses 25 in communication with an annularly relieved area 27. A wear plate 26 in the form of a ring is received within the annularly relieved area 27 of the plate 17 with bosses 28 integral with the wear plate being received in the complementary formed recesses 25. The bosses are drilled and countersunk as at 29 for the reception of flat head machine screws 30 which are preferably of the type having a high torque receiving capability. The head of said screws is co-planar with the relieved area 27 of the top plate for obvious reasons.

Wear plate 26 is preferably cast of phosphor-bronze metal which is well known to have the desirable characteristic of being wear resistant as evidenced by its common use in bearings and gears.

The central portion of the top plate 17 of the turntable defines a bore 31 receiving the pin 20. Bore 31 is counterbored upwardly as at 32 and thereat provided with radially positioned screw sockets 33. The counterbore 32 thus provided receives the upper terminus of the turntable hub as shown in FIGURE 2. Additionally, plate 17 is preferably provided with two or more lubrication passageways 35 in communication at their innermost ends with an annular groove 36 in the wear plate 26 and at their outer ends with conventional pressure type lubrication fittings.

A seal is indicated at 37 secured within an annular groove 38 provided adjacent the outer periphery of top plate 17 and may be of semi-rigid, durable material such as neoprene rubber or nylon terminating at its lower end in wiping contact with a perimetrical shoulder 40 in the bottom plate 18. Moisture as well as foreign matter is thus prevented from contact with the bearing surfaces of the turntable.

With further regard to bottom plate 18, the peripheral shoulder 40 receives seal 37 and eventually, after an extended period of use, the rim 17A of the top plate 17, as illustrated in FIGURE 2A. The shoulder in section, defines an angle of slightly less than 90 degrees for the purpose of confining the lower end of seal 37 within the periphery of the lower plate. Centrally formed within the lower plate for reception of the hub is a downwardly tapering opening 41 constituting a conical bushing for said hub.

The first form of hub, indicated generally at 45 in FIGURES 2 and 4, comprises a ring 46 apertured as at 46A for the reception of cap screws 47 which attach the hub concentrically to the top plate 17 by means of the threaded sockets 33. Secured by annular welds 48–49 to the lower end of ring 46 is a collar 50 having a skirt portion 50A extending downwardly from the ring 46. In circumferential engagement with the collar 50 is a bearing 51 of frusto-conical shape and preferably of cast phosphor-bronze metal. From the foregoing, it will be apparent that the bearing 51 so constructed incurs all radial and a portion of the thrust of the loads imparted to the upper and lower turntable plates by the bunk and trailer structures. The substantial bearing surface area 51A of the bearing 51 results in the latter being very long-lived.

The inner periphery indicated at 26A of the wear plate 26 as shown in FIGURE 2, is secured within the relieved area 27 by abutting engagement with the upper surface of bearing 51.

The modified form of hub indicated generally at 60 in FIGURES 5 and 6, differs in structure from the hub 45 by reason of each of its components, ring 61, collar 62 and bearing 63 having a greater vertical dimension than their aforementioned counterparts. In the spaced apart position of the turntable members of FIGURE 6 incident to the weighing of the log load, the lower terminus of bearing 63 of the modified hub remains for purposes of alignment within the cone shaped bushing provided by opening 41 in the lower plate 18. Air scales now in use can function properly with an inch or slightly less vertical travel of the turntable plate 17 as indicated at $x$.

In the manufacture of both forms of hubs, the phosphor-bronze or other suitable bearing material is applied to the ring and collar members thereof in any suitable manner, the most economical of which is the contraction upon cooling of the phosphor-bronze casting about said members.

FIGURES 7 and 8 show a novel construction of one of a pair of rub irons indicated generally at 64 in FIGURE 1, wherein a replaceable wear surface 16 is attached in a manner similar to that recited above for the wear plate 26. Rub irons are conventionally mounted outboard of the turntable as shown in FIGURE 1 to provide additional support for the bunk structure 13 during pivotal movement thereof about the axis of pin 20 resulting from turns negotiated by the log truck.

Replacement of conventional rub irons entails time consuming cutting and welding operations. In our novel application, the wear surfaces 16 are attached to the supporting brackets indicated at 66 by bosses 67 integral with the wear surface. In continuing similarity to the wear plate of the turntable the wear surfaces 16 may be replaced simply by removal of fasteners 68, the latter in the form of flat head machine screws. If desired, the bosses 67 along with bosses 28 of the wear plate 26 may be in the form of steel inserts annularly welded in place within apertures formed respectively in the wear surfaces 16 and wear plate.

From the foregoing it will be apparent that the replacement of all surfaces subject to wear involves only the removal of conventional fastener elements. Of particular importance to the individual owner-operator who performs his own maintenance is the accessibility, in kit form from the manufacturer, of the wear plate 26, hub 45 or 60 and wear surfaces 16 for complete refurbishment of the turntable and rub irons.

The two forms of interchangeable hub facilitates greatly the task of adapting a log truck and trailer for use with air scale weighing devices. Upon removal of center pin 20 and separation of the bunk structure and trailer and their attached turntable plates 17–18, the hubs 45 and 60 may be interchanged by simple removal of cap screws 47. In reassembly, the nut members 21 securing the center pin 20 will require adjustment to either restrict or permit such axial movement of the upper and lower turntable plates. Where an owner-operator of a log truck typically enters into several successive hauling contracts with different logging contractors, the interchangeability of hubs is important in view of the fact that the use of air scales is not universal in the field.

Although the present turntable is shown and described as applied to logging trucks, the same novel features may be applied to the attachment points of other truck and trailer combinations, such points being known in the art as "fifth wheels."

While we have shown and described two particular embodiments of our invention, we are aware that minor modifications will readily suggest themselves to others skilled in the art without departing from the spirit and scope of the invention as claimed. Having thus described our invention;

We claim:

1. Log bunk supporting means for a truck allowing pivotal movement of the truck relative to a load carried by the log bunk, said supporting means comprising;
    a turntable including opposed, top and bottom plates secured respectively to the log bunk and the truck, one of said plates characterized by a relieved area formed therein and a plurality of recesses in communication with said relieved area,
    an annular wear plate intermediate said top and bottom plates for supporting axially directed loads imparted to the turntable removably attached to one of said plates within the relieved area therein,
    a hub removably attached to one of said plates including a bearing surface in contact with the other of said plates,
    first fastening means removably attaching said hub to one of said plates,
    a center pin extending through said turntable and said hub,
    pairs of rub iron laterally disposed from said turntable including opposed top and bottom, horizontally disposed replaceable wear surfaces removaly attached respectively to bracket members carried by the log bunk and the truck, said bracket members having a plurality of recesses formed therein,
    said wear plate and said wear surfaces each provided with a plurality of bosses, the latter being received respectively within the recesses of one of said plates and the recesses formed within said brackets, and
    second fastening means extending through said bosses attaching said wear plate to one of said turntable plates and said wear surfaces to their respective brackets.

2. Log bunk support means as claimed in claim 1 wherein the bearing surface of said hub is of frusto-conical shape and of a vertical dimension substantially equal to said other of said plates.

3. Log bunk supporting means as claimed in claim 2 wherein the bearing surface of said hub is of greater vertical dimension than said other of said plates whereby upon axial displacement of the turntable plates during the weighing of the log load the bearing surface will remain in occupying relationship with the other of said plates.

4. A turntable for trucks comprising in combination;
top and bottom turntable plates secured respectively to a log bunk and a truck with one of said plates characterized by an annularly relieved area formed therein and a plurality of recesses in communication with said relieved area,
a center pin extending through said turntable plates,
an annular wear plate intermediate said top and bottom plates for supporting axial loads imparted to the turntable removably attached to one of said turntable plates within the relieved area therein,
bosses integral with said wear plate and occupying said recesses including associated fastening means removably attaching said wear plate to one of said turntable plates, and
a hub removaly attached to one of said turntable plates including a bearing surface normally in contact with the other of said turntable plates.

5. A turntable as claimed in claim 4 wherein the bearing surface of said hub is of frusto-conical shape and of a vertical dimension substantially equal to said other of said plates.

6. A turntable as claimed in claim 5 wherein the bearing surface of said hub is of greater vertical dimension than said other of said plates whereby upon axial displacement of the turntable plates during elevation of the log bunk incident to the weighing of the log load said bearing surface will remain in occupying relationship with the other of said plates.

7. A turntable as claimed in claim 4 wherein said bosses and associated fastening means for the wear plates are vertically offset from the surface of said wear plate and thereby not subjected to wear.

8. A turntable as claimed in claim 4 wherein said hub is in supporting surface contact with the inner periphery of said wear plate.

9. A turntable as claimed in claim 4 wherein said wear plate and said bearing surface of said hub are of abrasion resistant material.

10. A turntable as claimed in claim 4 wherein one of said turntable plates has a perimetrical shoulder for the reception of an annular seal carried by the other of said turntable plates, said shoulder defining, in section, an angle of less than 90 degrees for confining the end portion of said seal.

References Cited
UNITED STATES PATENTS

| | | | |
|---|---|---|---|
| 481,655 | 8/1892 | Olsen | 308—136 X |
| 3,011,798 | 12/1961 | Gates | 308—136 X |

BENJAMIN HERSH, *Primary Examiner.*

P. GOODMAN, *Assistant Examiner.*